I. ATKINS.
Paddle-Wheels.

No. 142,322. Patented September 2, 1873.

Witnesses.
Wm L. Jackson
E. W. Parsons.

Inventor.
Ira Atkins

UNITED STATES PATENT OFFICE.

IRA ATKINS, OF LOUISVILLE, KENTUCKY, ASSIGNOR OF ONE-HALF HIS RIGHT TO JOHN B. SWAN, OF SAME PLACE.

IMPROVEMENT IN PADDLE-WHEELS.

Specification forming part of Letters Patent No. 142,322, dated September 2, 1873; application filed February 17, 1873.

*To all whom it may concern:*

Be it known that I, IRA ATKINS, of Louisville, Kentucky, have invented certain Improvements in Paddle-Wheels, of which the following is a specification:

The following is a description of my invention of a paddle-wheel for boats, consisting of self-acting swinging-hinge paddles and cam-acting locks: The main object of my invention is to obviate the raising of water by the paddles after their force as a propelling power is exhausted.

Figure 3:
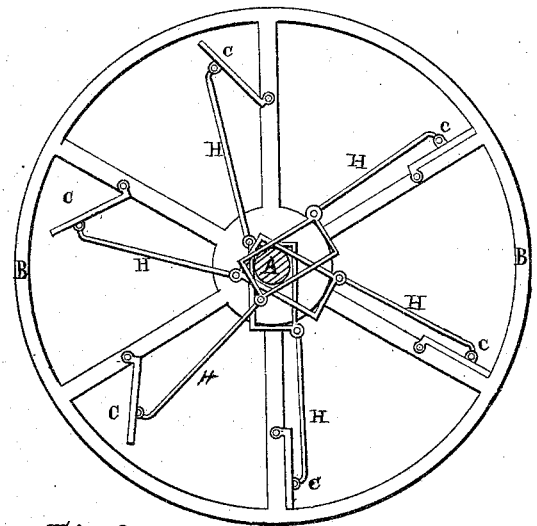
Figures 1, 2:
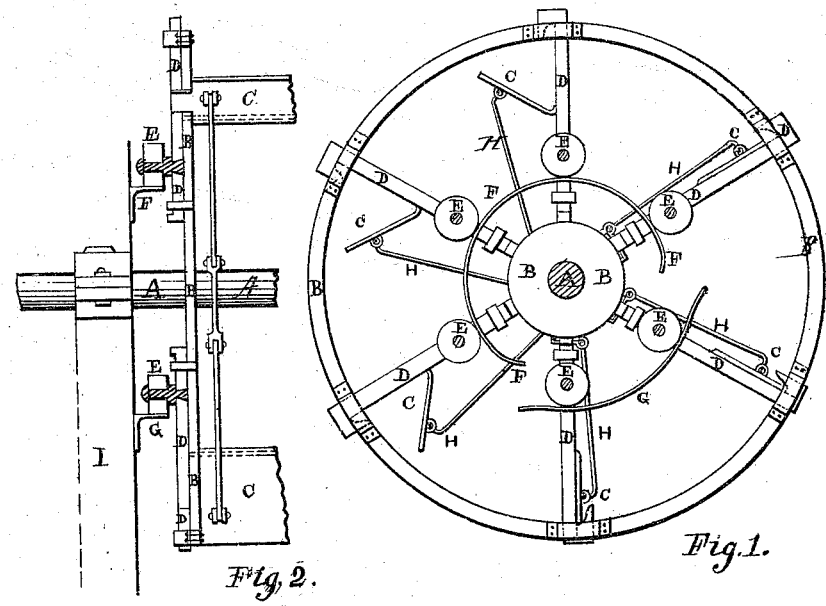

The paddles, represented by letter C, as shown on drawing, Fig. 2, are connected by rods H, shown on drawing, Fig. 3. The friction-rollers E, on drawing, Fig. 1, are connected with and move locks D. As they move from left to right around the circle of cams F and G, shown on Fig. 1, passing around to cam G, they lock their respective paddle before it enters the water; it remains locked until it passes to lower cam F; then it has accomplished its work and is unlocked. The pressure of water forces it back; it, being connected by rods H, as shown on Fig. 3, to its opposite paddle, forces that down on the arm of the wheel in a position to receive the locks, when it passes to cam G. In reversing the wheel to back the boat the paddles will be drawn back to their locked position, and supported by the arm of the wheel in the ordinary method.

Having thus described my invention, I claim as new and useful and of my invention, and which I desire to secure by Letters Patent—

The swinging hinged paddles, in combination with their connecting-rods, the cams, and locking-stops, the whole combined, arranged, and operating substantially as described.

IRA ATKINS.

Witnesses:
WM. L. JACKSON,
C. W. PARSONS.